UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

METHOD OF FORMING PHENOLIC CONDENSATION PRODUCTS.

1,146,300.  Specification of Letters Patent.  Patented July 13, 1915.

No Drawing.  Application filed August 4, 1913. Serial No. 782,943.

*To all whom it may concern:*

Be it known that I, JONAS W. AYLSWORTH, a citizen of the United States, and a resident of East Orange, county of Essex, State of New Jersey, have invented certain new and useful Improvements in Methods of Forming Phenolic Condensation Products, of which the following is a description.

My invention relates to methods of forming phenolic condensation products, and particularly to methods in which phenol and formaldehyde, or their equivalents, are initially caused to react in the presence of a basic condensing agent to form a reaction product which is soluble in alcohol, acetone, phenol, and other solvents, or in mixtures of the same, but not in water. Such products are commonly partial condensation products formed by causing the reaction of phenol and formaldehyde in the presence of a small percentage of a basic agent, the phenol and formaldehyde being present in substantially equi-molecular proportions, or such proportions as to yield, on sufficient heating, an infusible, insoluble condensation product, and arresting the reaction when the same has proceeded only to an oily or resinous product, which is fusible and soluble as stated. In such processes the partial condensation product formed may be mixed with filling materials, or caused to impregnate wood or other fibrous materials, used as a varnish, or put to other uses, and subsequently hardened to the infusible, insoluble state, by the application of heat or heat and pressure. In such a process the base or alkali used as condensing agent, added to the initial reagents or at a later stage of the process, is commonly left in the final product, in whole or in part, because of the difficulty of removing the same by the well-known working methods. This is a fault in such processes, since the presence of these substances in the finished product impairs the quality of the same. It has been proposed, in methods such as I have referred to above, to use the basic agent in relatively small proportions, as from one-half to twenty per cent. by weight of the phenol or phenolic body used, to avoid the necessity of eliminating the same. The presence of the base used, however, even in relatively small proportions in the finished product, impairs the electrical insulating properties of the product to a marked degree.

The object of my present invention is accordingly to so conduct processes of the character referred to above as to convert the basic agent used into an electrically-insulating salt, which may be left in the finished product without impairing the dielectric strength thereof.

Other objects of my invention will appear more fully in the following specification and appended claims.

In a process of the character referred to, the basic agent used may be ammonia, or compound or derivative of the type $NH_3$, possessing basic properties, caustic alkalis or their carbonates, such as sodium hydroxid, or other bases which are soluble in alcohol or water and form water- and alcohol-soluble salts with acids. Or the basic agent used may be an alkaline earth oxid or hydroxid, such as the hydrates of calcium, strontium and barium. If an alkali of the first class is used as condensing agent, I neutralize the same with an organic acid or palmitic acid or an acid rosin such as colophony, such for example, as stearic acid, which is capable of forming an electrically-non-conducting salt with the alkali, as is stated in my application Ser. No. 780,453, filed July 22, 1913. If an alkali of the second class is used, the same may be neutralized in a suitable solution of the condensation product, such as an alcohol solution, with an acid which will form a non-conducting salt with the alkaline earth, preferred acids being sulfuric and carbonic. When these acids are used, in this form of the process, the salt formed is precipitated out of the solution, as an insoluble sulfate or carbonate, and may be removed, if desired, from the compound.

In the present application I will broadly claim the step of neutralizing the base, in processes of the kind referred to, to form an electrically-insulating salt, and will specifically claim the first species of such process referred to, in which the acid used for neutralizing the base is a suitable organic acid, particularly one of the higher fatty acids, such as stearic. By the expression "the higher fatty acids", I refer to members of the fatty acid series having a carbon content of ten or more atoms to the molecule, which are solid at ordinary temperatures, odorless and resemble paraffin wax in character. In a companion case "Production of plastic substances", Patent No. 1,111,288, issued September 22, 1914, I have described and claimed a process in which a water-soluble condensation product is formed by the aid of a considerable amount of an alkaline earth oxid, comprising phenol-alcohols in water solution, and the alkaline earth neutralized and precipitated as a water-insoluble, electrically-insulating salt. The said patent also claims as a sub-process the neutralization, precipitation and removal of the alkaline earth oxid by a suitable mineral acid, in any process for forming phenolic condensation products in which an alkaline earth oxid is used as condensing agent and a product soluble in a suitable solvent is formed. That is, in that patent the step of neutralizing the alkaline earth oxid, and precipitating the same as an insoluble salt, capable of removal, is covered broadly so as to include a process such as the second species of the process described herein, in which an alcohol-soluble, water-insoluble, condensation product is formed with the aid of an alkaline earth oxid, as well as the main process described in my said patent, in which a water-soluble product is formed with the aid of a comparatively large amount of an alkaline earth oxid.

In practising my invention phenol and formaldehyde or their equivalents are mixed together in suitable proportions with a basic condensing agent as stated, the phenol and formaldehyde being preferably used in substantially molecular proportions or in approximately equal volumes of commercial phenol or cresol and commercial formaldehyde solution, if a final, infusible, insoluble condensation product is desired. It is not essential, however, in my present invention, that these proportions of phenol and formaldehyde be used, and a greater or less proportion of formaldehyde than above referred to, may be used, as is well known, where a final product of a different degree of hardness is desired. The basic condensing agent used may be in any relatively small proportion, insufficient to cause the formation of phenol alcohol or other water-soluble product, in the case of a caustic alkali or alkaline earth oxid or hydroxid, my present application being concerned only with the formation of fusible, resinous condensation products which are not soluble in water. Generally speaking, the proportion of the base should be from 1 to 20 per cent. by weight of the phenol used. The basic condensing agent may be added to the initial mixture of phenol and formaldehyde or to either component of the mixture, or may be added in successive portions during the formation of the fusible alcohol-soluble product. As stated, the condensing agent used may be ammonia, anhydrous or aqueous, caustic alkalis or their carbonates, anilin or pyridin, basic salts or salts, which when boiled with formaldehyde, liberate an alkali, or other well known basic condensing agents of the first class referred to above, which are soluble in alcohol or other solvent in which the resinous partial reaction product to be formed, dissolves. Bases of the character referred to do not form salts which are insoluble in water, alcohol or the other solvents referred to, when neutralized with an acid, as stated above. I may also use, as above stated, an alkaline earth oxid or hydroxid, as condensing agent, such as the hydrates of barium, strontium, or calcium, and in this case, as stated, neutralization with a suitable acid will result in the precipitation of an insoluble insulating salt.

The reaction may be carried out in the well known manner, the phenol and formaldehyde or other substance containing a reactive methylene group reacting upon each other to yield a product consisting of two liquids which will separate on standing, the upper layer consisting of separated water containing some water-soluble materials, and the lower layer comprising an oily or viscous liquid containing the initial products of condensation. The aqueous supernatant solution formed, may be removed or, if desired, the water may be evaporated, the product remaining constituting a partial condensation product which may subsequently be transformed, if desired, into an infusible, insoluble product by further heating. This partial product is soluble in alcohol, acetone and other solvents, and this product, or a product which is somewhat further condensed by heating, but which is still soluble in alcohol, acetone and other solvents, or mixtures of the same, but not in water, is then dissolved in any suitable one of these solvents. If the product has been formed with a base of the first class referred to, an organic acid is then dissolved therein capable of neutralizing the base and forming an electrically non-conducting salt therein, as stated. The acid used is preferably a higher fatty acid, such as stearic acid, the result of the neutralization being the formation in the solution of stearate of soda, or acid stearate of soda, as stated in my application Serial No. 780,453, referred to. Or an acid resin may be used, such as ordinary colophony. The acid should be added in sufficient proportion to neutralize the base used and an excess of the acid may be used without harmful effect. After the neutralization reaction the solution will contain both the partial condensation product and an insulating salt, as stated, and may subsequently be used as a varnish and hardened to infusibility and insolubility by heat or heat and pressure, or may be hardened in the well known manner into an infusible composition, either with or without the preliminary incorporation of materials to the solution, as desired.

If the basic condensing agent used is an alkaline earth oxid or hydroxid, a mineral acid, preferably sulfuric acid or carbondioxid may be used to neutralize the same. In this case an acid should be used in just sufficient quantity to exactly neutralize the base or in a slightly less quantity than sufficient to neutralize all of the base. In this case the partial or soluble condensation product is dissolved in a suitable solvent, such as alcohol, as stated, and is neutralized with dilute sulfuric acid or carbonic acid in the proper amount, carbon-dioxid gas, in accordance with my preferred method, being passed through the solution until neutralization is complete, as may be indicated by suitable tests. This neutralization results in the precipitation of an insoluble electrically insulating salt, and if it is desired to remove the same from the condensation product before further heating or use of the latter, this may readily be accomplished by filtration. When a higher fatty acid or acid resin is used for neutralizing a basic agent of the first class, as stated above, it should be noted that the acid used is non-water-soluble, and the resulting salt which is also non-water-soluble, is electrically-insulating in the anhydrous or dry state. The use of such an acid in forming the salt is advantageous in that moisture will not be attracted to the product, as is the case when a water-soluble acid is used. This is true not only in regard to the salt formed, but with reference also to the acid, in case traces of the latter remain in the product. The salts which are formed when bases of the second class are neutralized with mineral acids, as stated, are electrically insulating in the presence of water, as well as when water is not present.

Having now described my invention what I claim and desire to protect by Letters Patent is:—

1. In a process of making a condensation product of phenol and a methylene-containing substance, which comprises causing a partial reaction between phenol and a substance containing a reactive methylene group in the presence of a small proportion of a base and arresting the reaction when an alcohol-soluble, resinous, water-insoluble, partial condensation product has been formed, the step consisting in mixing with said product and base, in suitable solution, a non-water-soluble organic acid capable of forming an electrically-insulating salt with the said base, substantially as described.

2. In a process of making a condensation product of phenol and a methylene-containing substance, which comprises causing a partial reaction between phenol and a substance containing a reactive methylene group in the presence of a small proportion of a base of such a character as to form alcohol-soluble electrically-insulating salts with stearic acid, and arresting the reaction when an alcohol-soluble, resinous condensation product has been formed, the step consisting in mixing with said product and base, in suitable solution, a higher fatty acid capable of forming an electrically-insulating salt with the said base, substantially as described.

3. The process of making a phenolic condensation product which consists in acting in a suitable solution, on a soluble phenol-formaldehyde condensation product containing such a basic substance as will form an electrically-insulating salt with stearic acid, with an organic non-water-soluble acid capable of forming with the said base a salt which is electrically-insulating in the anhydrous state, substantially as described.

4. The process of making a phenolic condensation product which consists in acting in a suitable solution, on a soluble phenol-formaldehyde condensation product containing such a basic substance as will form an electrically-insulating salt with stearic acid, with stearic acid, to form a stearate of the base, substantially as set forth.

5. The process of making a phenolic condensation product which consists in bringing the product obtainable by mixing together and causing reaction between formaldehyde and phenol in suitable proportions to yield an infusible reaction product, together with a basic condensing agent, and arresting the reaction when an alcohol-soluble, water-insoluble, product has been formed, into contact, in suitable solution, with a non-water soluble acid capable of forming with the said basic agent, a salt which is electrically insulating, and hardening the product, substantially as described.

6. In a process of making a condensation product of phenol and a methylene-containing substance, which comprises causing a reaction between phenol and a substance containing a reactive methylene group in the presence of a small proportion of a base, to form a resinous product, the base used being one which is soluble in both alcohol and water and forms water and alcohol-soluble salts with acids, the step consisting in mixing, in suitable solution, with said product and base, an organic non-water-soluble acid capable of forming with the said base a salt which is electrically insulating, substantially as described.

This specification signed and witnessed this 1st day of August 1913.

JONAS W. AYLSWORTH.

Witnesses:
WILLIAM A. HARDY,
FREDERICK BACHMANN.

Copies of this patent may be obtained for five cents each, by addressing the "Commissioner of Patents, Washington, D. C."

It is hereby certified that in Letters Patent No. 1,146,300, granted July 13, 1915, upon the application of Jonas W. Aylsworth, of East Orange, New Jersey, for an improvement in "Methods of Forming Phenolic Condensation Products," errors appear in the printed specification requiring correction as follows: Page 1, lines 78–79, strike out the phrase "or palmitic acid or an acid rosin such as colophony"; same page, line 80, after the word "acid" insert the phrase *or palmitic acid or an acid rosin such as colophony;* and that the said Letters Patent should be read with these corrections therein, that the same may conform to the record of the case in the Patent Office.

Signed and sealed this 24th day of August, A. D., 1915.

[SEAL.]

J. T. NEWTON,
*Acting Commissioner of Patents.*